United States Patent [19]
Call et al.

[11] Patent Number: 5,101,445
[45] Date of Patent: Mar. 31, 1992

[54] METHOD AND APPARATUS FOR FILTERING DIGITAL DATA BY CONCATENATING PREPROCESSED OVERLAPPING GROUPS OF THE DATA

[75] Inventors: Roger W. Call; Benjamin V. Cox, Jr., both of Salt Lake City, Utah

[73] Assignee: Unisys Corporation, Blue Bell, Pa.

[21] Appl. No.: 324,490

[22] Filed: Mar. 16, 1989

[51] Int. Cl.⁵ .............................................. G06K 9/40
[52] U.S. Cl. .......................................... 382/54; 382/27
[58] Field of Search ........................ 382/31, 27, 50, 54; 358/37, 85, 42; 364/724.05, 724.12, 725

[56] References Cited

U.S. PATENT DOCUMENTS 4,288,779  9/1981  Otsu et al. .............................. 382/27
4,703,513  10/1987  Gennery ................................ 382/27
4,720,871  1/1988  Chambers ............................. 358/37

Primary Examiner—Leo H. Boudreau
Attorney, Agent, or Firm—Charles J. Fassbender; Mark T. Starr

[57] ABSTRACT

An image, of the type that is comprised of an array of pixels, is filtered by the steps of: (a) reading a respective group of pixels from the array for each individual pixel that is in the array, with each pixel group overlapping other pixel groups and consisting of pixels that are contiguous with the individual pixel; (b) quantizing each of the respective groups of pixels; (c) retrieving from a memory, a single pixel for each quantized group of pixels, with the single pixel being the result of a pre-performed transformation on the quantized group of pixels; and (d) concatenating the retrieved pixels to form the filter image.

10 Claims, 7 Drawing Sheets

FIG. 2
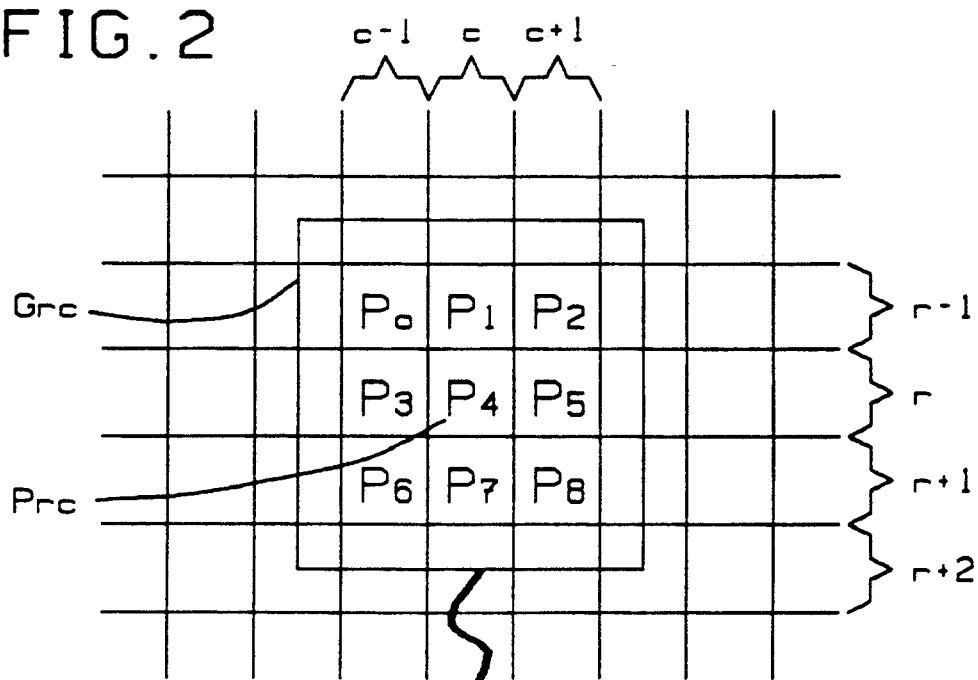
$X_{rc} = (P_0) + 2(P_3) + (P_6) - (P_2) - 2(P_5) - (P_8)$
$Y_{rc} = (P_0) + 2(P_1) + (P_2) - (P_6) - 2(P_7) - (P_8)$
$Z_{rc} = (X_{rc}^2 + Y_{rc}^2)^{\frac{1}{2}}$
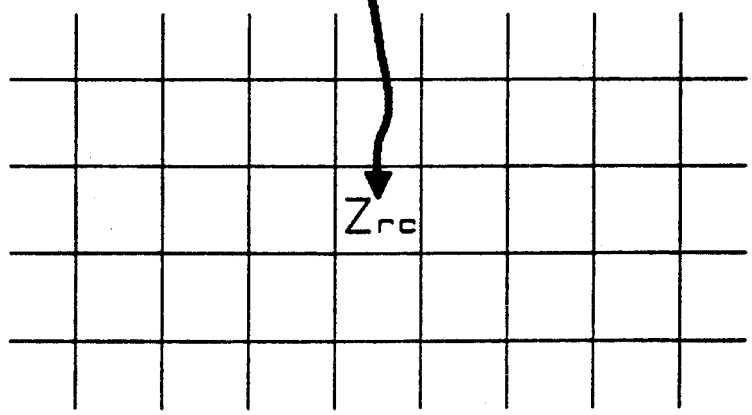

FIG. 4

$$H = \begin{array}{|c|c|c|} \hline h0 & h1 & h2 \\ \hline h3 & h4 & h5 \\ \hline h6 & h7 & h8 \\ \hline \end{array}$$
60

$$G = \begin{array}{|c|c|c|} \hline g0 & g1 & g2 \\ \hline g3 & g4 & g5 \\ \hline g6 & g7 & g8 \\ \hline \end{array}$$
61

$$62 \searrow X = k_1 \sum_{i=0}^{8} h_i \cdot p_i$$

$$63 \searrow Y = k_2 \sum_{i=0}^{8} g_i \cdot p_i$$

$$64 \searrow Z = f(X, Y)$$

EXAMPLE: #1

$$H = \begin{array}{|c|c|c|} \hline 1 & & 1 \\ \hline 2 & & -2 \\ \hline 1 & & -1 \\ \hline \end{array}$$

$$G = \begin{array}{|c|c|c|} \hline 1 & 2 & 1 \\ \hline & & \\ \hline -1 & -2 & -1 \\ \hline \end{array}$$

$k_1 = 1, k_2 = 1$ $f = sqrt(X^2 + Y^2)$

EXAMPLES: #2

$$H = \begin{array}{|c|c|c|} \hline 1 & -1 & \\ \hline & & \\ \hline & & \\ \hline \end{array}$$

$$G = \begin{array}{|c|c|c|} \hline 1 & & \\ \hline -1 & & \\ \hline & & \\ \hline \end{array}$$

$k_1 = 1, k_2 = 1$ $f = sqrt(X^2 + Y^2)$

EXAMPLES: #3

$$H = \begin{array}{|c|c|c|} \hline 1 & 1 & 1 \\ \hline 1 & & 1 \\ \hline 1 & 1 & 1 \\ \hline \end{array}$$

$$G = \begin{array}{|c|c|c|} \hline & & \\ \hline & 1 & \\ \hline & & \\ \hline \end{array}$$

$k_1 = 1/8, k_2 = 1$ if $(Y-X) > \alpha$ $Z = X$ if $(Y-X) < \alpha$ $Z = Y(p4)$

FIG.5

$$H = \begin{array}{|c|c|c|} \hline h0 & h1 & h2 \\ \hline h3 & h4 & h5 \\ \hline h6 & h7 & h8 \\ \hline \end{array}$$

70

71 → $Z = k \sum_{i=0}^{8} hi \cdot pi$ $$H = \begin{array}{|c|c|c|} \hline 1 & 1 & 1 \\ \hline 1 & 2 & 1 \\ \hline 1 & 1 & 1 \\ \hline \end{array}$$

EXAMPLE #1
LOWPASS FILTER   k = 1/10

$$H = \begin{array}{|c|c|c|} \hline 0 & -1 & 0 \\ \hline -1 & 5 & -1 \\ \hline 0 & -1 & 0 \\ \hline \end{array}$$

EXAMPLE #2
HIGHPASS FILTER   k = 1

METHOD AND APPARATUS FOR FILTERING DIGITAL DATA BY CONCATENATING PREPROCESSED OVERLAPPING GROUPS OF THE DATA

BACKGROUND OF THE INVENTION

This invention relates to methods and apparatus for filtering digital data signals; and more particularly, it relates to methods and apparatus for filtering images of the type which are made up of an array of such signals.

In the prior art, visual images have been converted into an array of digital data signals called pixels. Also in the prior art, these arrays of pixels have been filtered in various ways in order to enhance the image. However, an image usually includes huge numbers of pixels, and conventional image filtering processes require scores of multiplications and additions to be performed for each pixel. Consequently, conventional image filtering processes require a great deal of processing time and are very complicated.

An attempt to filter images in a simpler and quicker fashion is disclosed in a U.S. patent application Ser. No. 157,199 by Chabries and Christiansen which is entitled "Method of Forming Visual Images in Radar by Utilizing Preconvolved Quantized Vectors" filed Feb. 17, 1988, now U.S. Pat. No. 4,977,60. In that application, a method of filtering images by convolution is described in which conventional fast Fourier transform operations and convolution operations are eliminated. Instead, those operations, which are very time consuming, are replaced by a repetitive sequence of shifting and adding; and that enables the Chabries-Christiansen filtering to be performed relatively quickly.

However, a major limitation of the Chabries-Christiansen method is that it is limited to the convolutional type of filtering. This is evident from the fact that the convolution operation is linear, and so the principle of superposition applies. Superposition is what is occurring in the repetitive shift and add sequence. Thus, the Chabries-Christiansen method simply will not work for filtering which is nonlinear. Such nonlinear filtering occurs in many ways such as, for example, whenever one of the operations that is to be performed on the pixels involves a squaring or a square root.

Also, another limitation of the Chabries-Christiansen filter is that its multiple shift and add operations require a certain amount of circuitry to be carried out, and that adds to the filter cost. Further, performing multiple shift and add operations inherently takes a certain amount of time, which limits the maximum speed of the filter.

Accordingly, a primary object of the invention is to provide another method and apparatus for filtering digital data which completely eliminates all of the above limitations.

BRIEF SUMMARY OF THE INVENTION

In accordance with the present invention, an image of the type that is comprised of an array of pixels, is filtered by the steps of: (a) reading a respective group of pixels from the array for each individual pixel that is in the array, with each pixel group overlapping other pixel groups and consisting of pixels that are contiguous with the individual pixel; (b) quantizing each of the respective groups of pixels; (c) retrieving from a memory, a single pixel for each quantized group of pixels, with the single pixel being the result of a pre-performed transformation on the quantized group of pixels; and (d) concatenating the retrieved pixels to form the filtered image.

BRIEF DESCRIPTION OF THE DRAWINGS

Various features and advantages of the invention are described herein in conjunction with the accompanying drawings wherein:

FIG. 2 illustrates one specific example of the FIG. 1 filtering process in which edges in an image are enhanced;

FIG. 4 illustrates one general class of filtering that can be achieved with the FIG. 1 process;

FIG. 5 illustrates a second general class of filtering that can be achieved with the FIG. 1 process;

DETAILED DESCRIPTION OF THE INVENTION

Figure 1:
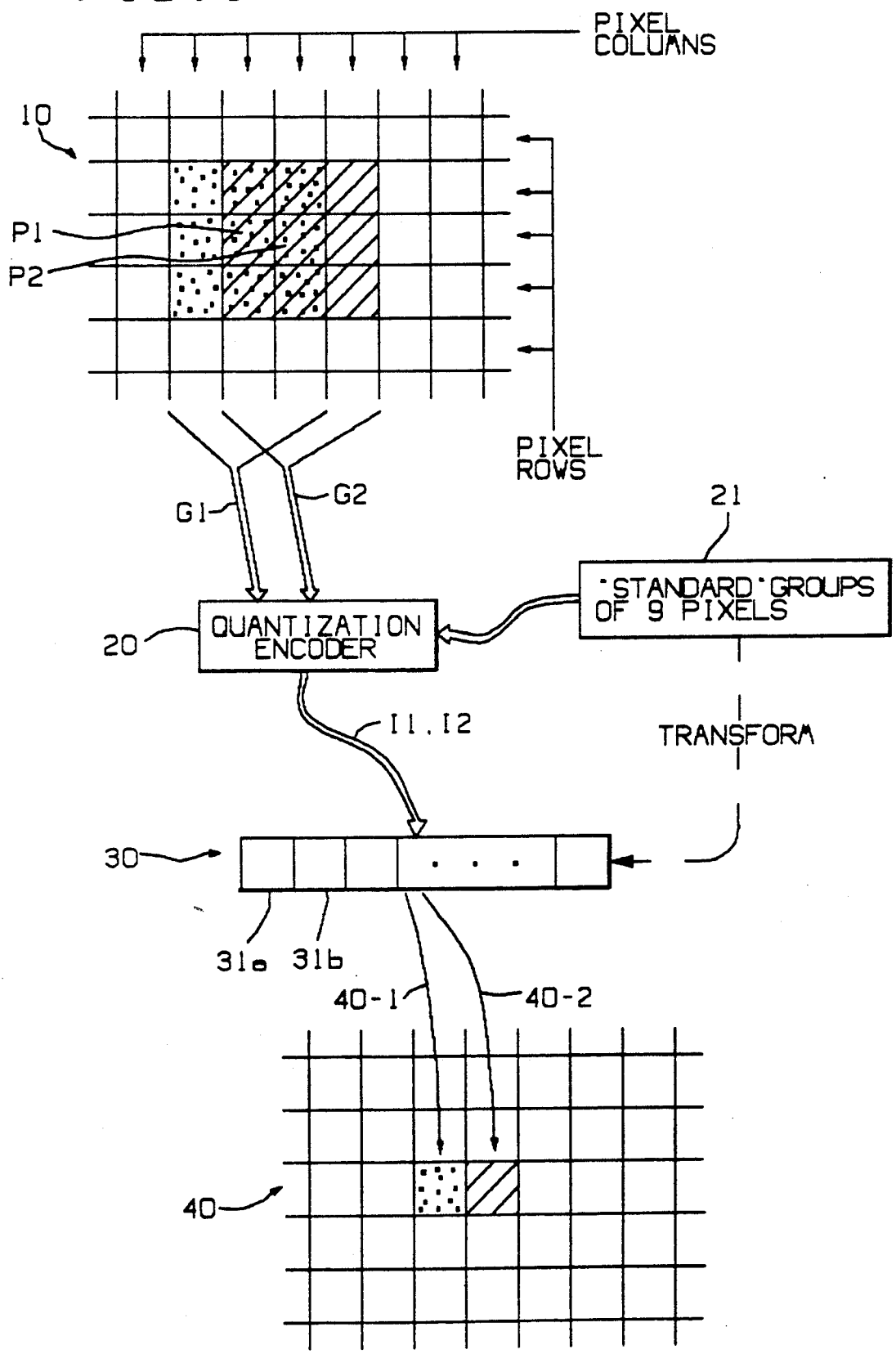
FIG. 1 illustrates the steps by which an image is filtered in accordance with the present invention.

Turning now to FIG. 1, it illustrates the steps by which an image is filtered in accordance with the present invention. In FIG. 1, the original unfiltered image is indicated by reference numeral 10. This image is comprised of a plurality of pixels which are arranged as an array of rows and columns. Each pixel in the image 10 is represented in FIG. 1 by one square of the array. This array can have any number of pixels per row and any number of pixels per column.

As one step of the FIG. 1 filtering process, respective groups of nine pixels are read from the image 10 for each particular pixel that is in that image. Each group of nine pixels includes the particular pixel itself plus the eight other pixels which surround it. For example, in FIG. 1, one particular pixel is labeled P1; and its corresponding group of pixels is labeled G1. All of the pixels of group G1 are indicated in FIG. 1 with dots. Similarly, another particular pixel in the image 10 is labeled P2; and its corresponding group of pixels is labeled G2. All of the pixels of group G2 are indicated with hatch lines.

From the above, it is evident that the respective pixel groups overlap each other. That is, each pixel is included in several different groups. In general, pixel group G1 consists of all of the pixels that need to be operated on in order to produce the filtered output of a single pixel at the position of pixel P1. Similarly, pixel group G2 consists of all of the pixels that need to produce the filtered output of a single pixel at the position of pixel P2. What those operations are, and when they occur, is explained in further detail in conjunction with FIGS. 2-6.

As another step in the FIG. 1 filtering process, each of the pixel groups G1, G2, etc. is quantized and encoded. This step is performed in FIG. 1 by a quantization encoder 20. During this step, each of the pixel groups G1, G2, etc., is compared to several "standard" pixel groups 21 in order to identify the one standard group of pixels which most closely matches the actual group of pixels. In FIG. 1, the identification of the standard group of pixels which most closely matches the actual pixel group G1 is indicated as I1; and the identification of the standard group of pixels which most closely matches the actual pixel group G2 is indicated as I2.

As a further step in the FIG. 1 filtering process, each of the pixel group identifiers from the quantization-encoder 20 is used to retrieve a single pixel from a memory 30. In FIG. 1, reference numerals 31a, 31b, . . . represent respective pixels in the memory 30. Pixel 31a in memory 30 is the result which is obtained by performing predetermined operations on one of the standard groups of pixels; pixel 31b in memory 30 is the result which is obtained by performing the same operations on another standard group of pixels; etc.

To complete the FIG. 1 filtering process, all of the pixels that are retrieved from memory 30 by the pixel group identifiers I1, I2, . . . , are simply concatenated together in the same order as the pixels in the original image 10. In FIG. 1, these concatenated pixels form an array of pixels 40 which is the filtered image. Pixel 40-1 was retrieved from memory 30 by the identifier I1; pixel 40-2 was retrieved from memory 30 by the identifier I2; etc.

By utilizing the above-described process, the original image 10 can be filtered in many different ways. And, for each different type of image filtering, all that changes are the pixel values that are stored in the memory 30. For example, FIG. 2 shows how the FIG. 1 filtering process can be used to enhance edges in the image 10. In FIG. 2, symbol $P_{rc}$ represents one particular pixel P at a row r and a column c in image 10, and symbols $P_0$ through $P_8$ represent the pixels in the corresponding pixel group $G_{rc}$. Pixels $P_0$-$P_8$ respectively are at the row-column pairs of (r-1,c-1), (r-1,c), (r-1,c+1), (r,c-1), (r,c), (r,c+1), (r+1,c-1), (r+1,c), and (r+1,c+1).

All of the pixels in group $G_{rc}$ need to be operated on in order to edge enhance the single pixel $P_{rc}$, and equations 51, 52 and 53 in FIG. 2 state how these operations should occur. But, since the pixel group $G_{rc}$ in the image 10 is quantized by the FIG. 1 process before the operations of equations 51-53 occur, these operations can be performed "off line" on the standard pixel groups, rather than on the pixel group from the original image 10.

Thus, the FIG. 1 filtering process can be performed very quickly since it completely eliminates any of the operations of equations 51-53 on pixel groups from the image 10 itself. Instead, the standard pixel groups are pre-processed and the resulting filtered pixels are stored in memory 30. Thereafter, the filtered pixels that are read from memory 30 by the identifiers $I_1$, $I_2$, etc. are simply concatenated together.

Figure 3:
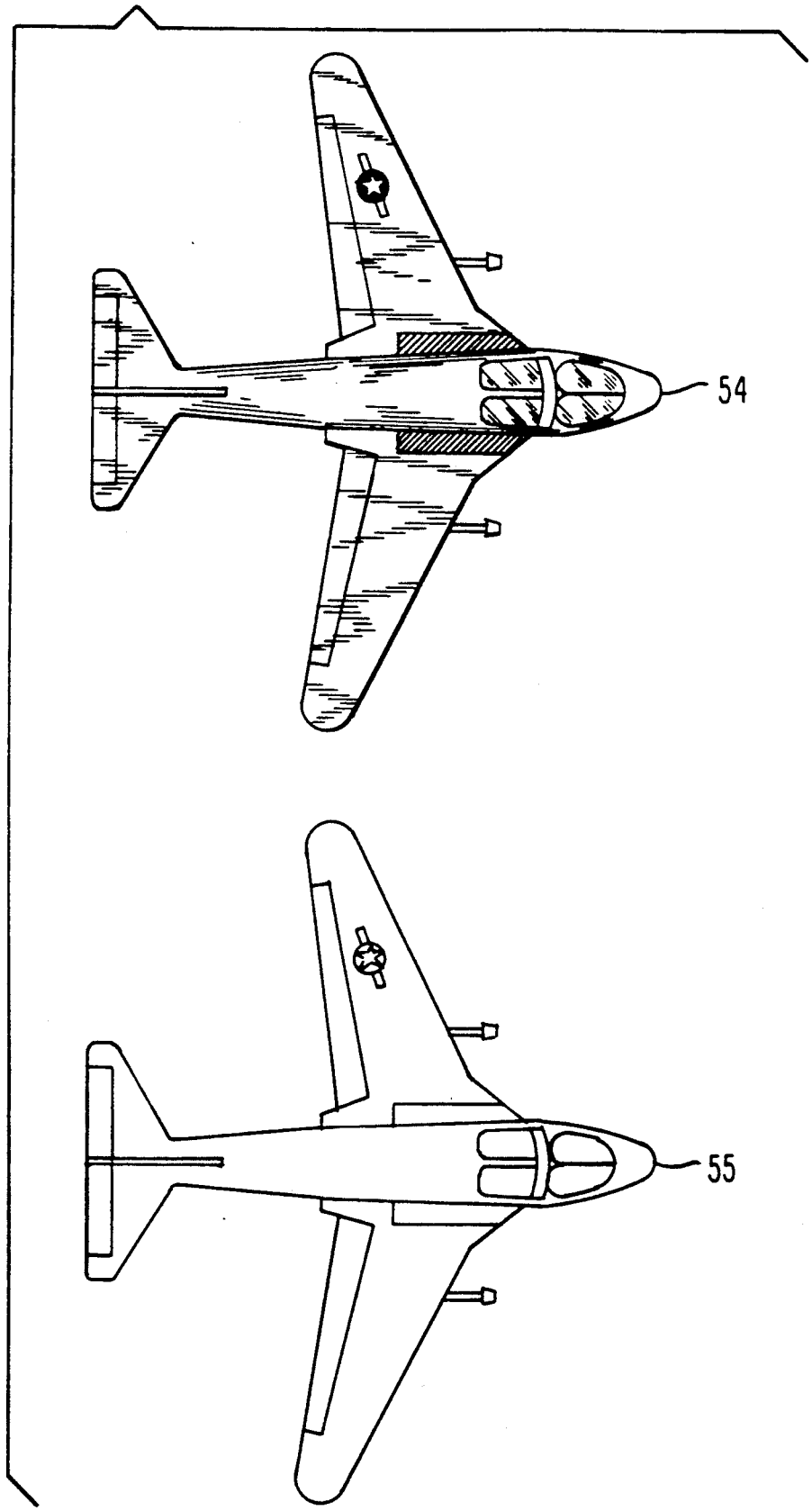
FIG. 3 shows an actual image which was filtered by the FIG. 2 edge enhancement process.

An example of how the filtering process of FIGS. 1 and 2 affects an image is illustrated in FIG. 3. There, reference numeral 54 indicates an image of a plane, which corresponds to the image 10 of FIG. 1. After the image 54 has been filtered by the steps of FIGS. 1 and 2, the result is an edge enhanced image as indicated by reference numeral 55.

This particular filtering process of FIG. 2 is only one example of a more generalized filtering process which is shown in FIG. 4. There, reference numeral 60 indicates a 3×3 matrix of constants; reference numeral 61 indicates another 3×3 matrix of constants; and reference numerals 62-64 indicate a set of equations which state how the matrices 60 and 61 should operate on each standard pixel group in order to obtain the pre-filtered pixels in memory 30. This filtering becomes identical to the FIG. 2 filtering when the entries in the matrices 60 and 61 and the parameters of the equations 62-64 are set as indicated by the FIG. 4 example #1.

On the other hand, when the entries in the matrices 60 and 61 and the parameters of equations 62-64 are set as indicated by the FIG. 4 example #2, then the FIG. 1 process differentiates the image 10. Such differential filtering has the effect of highlighting any parts of the image which change quickly from light to dark, or vice versa.

Further, when the entries in the matrices 60 and 61 and the parameters of equations 62-64 are set as shown in the FIG. 4 example #3, then the FIG. 1 process filters the image 10 such that speckles or bright spots are removed from it. Such speckles can be introduced into the image by noise when the image is transmitted, for example.

Another version of the FIG. 1 filtering process is shown in FIG. 5. There, the pixels of each standard pixel group are pre-transformed as indicated by one matrix 70 and one equation 71. This transformation has the effect of passing the image 10 through a convolution filter. One example of a lowpass convolution filter, which will smooth or soften the image, and is achieved by setting the entries in the matrix 70 and the parameters of equation 71 as indicated by the FIG. 5 example #1. Conversely, highpass convolution filtering is achieved by setting the entries in the matrix 70 and the parameters of equation 71 as indicated in the FIG. 5 example #2.

Figure 6:
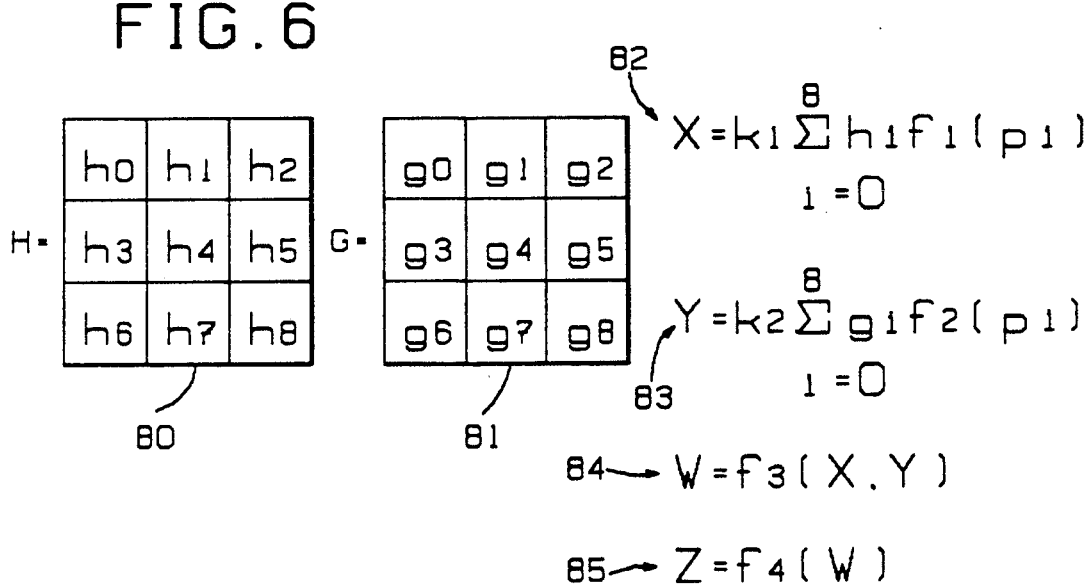
FIG. 6 illustrates a third general class of filtering that can be achieved with the FIG. 1 process.

Still another version to the FIG. 1 filtering process is shown in FIG. 6. There, the standard pixel groups are pre-transformed via two matrices 80 and 81 and four equations 82-85. This results in the image 10 being passed through a homomorphic filter. One particular way in which the entries in the matrices 80 and 81 and the parameters of the equations 82-85 can be set is indicated by the FIG. 6 example #1; and the effect of that filtering on the image 10 is that it accentuates features of the image which lie in shadows.

Figure 7:
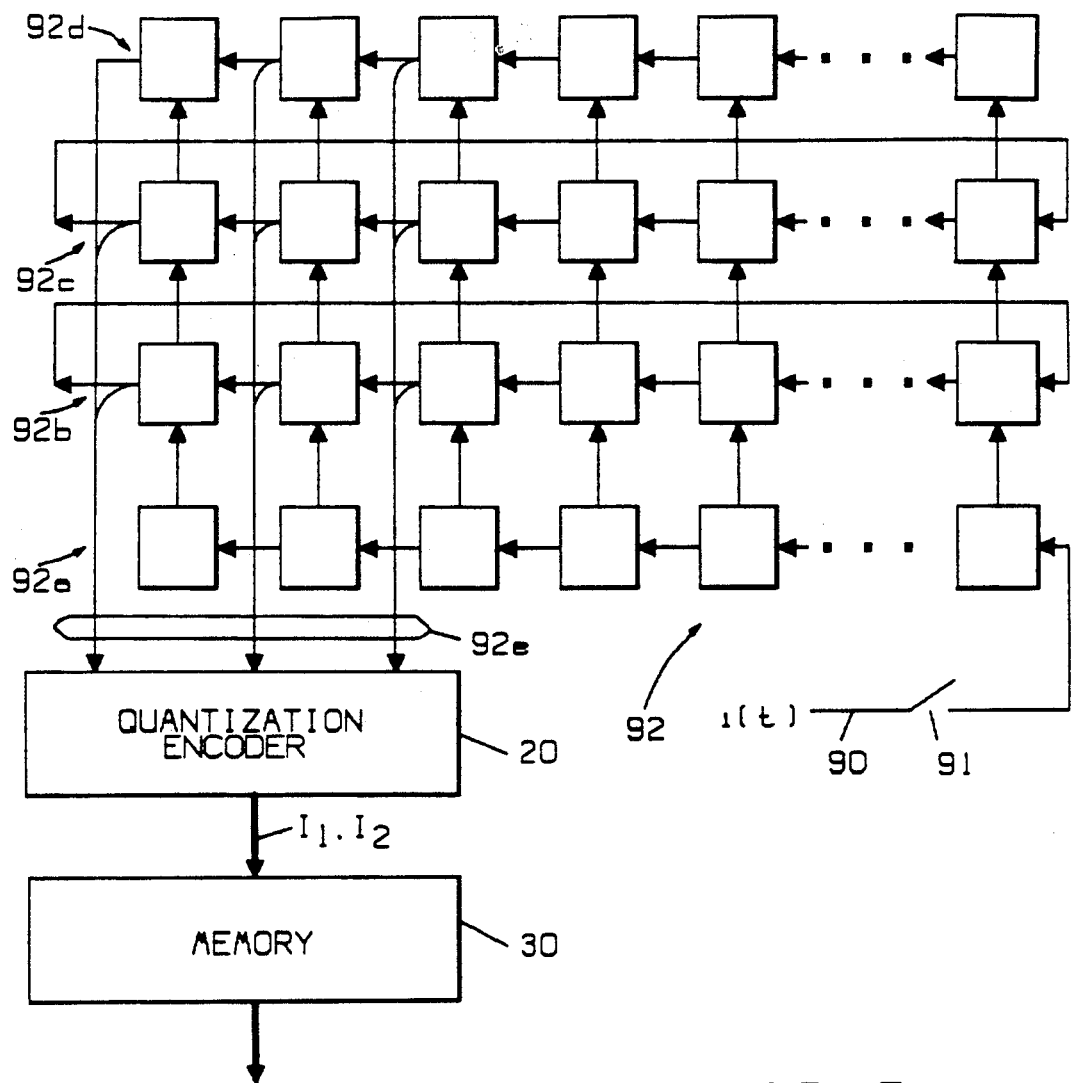
FIG. 7 illustrates an electronic circuit which sequentially forms the groups of pixels that are operated on in the FIG. 1 process.

Next, turning to FIG. 7, it shows an electronic circuit which operates to carry out the FIG. 1 process. This circuit has an input terminal 90 which receives a signal i(t) that represents the image in an analog form, just like the signal which is sent to the screen of a TV set. Signal i(t) varies with time such that its magnitude is proportional to one row of the image as it appears on the TV screen from left to right; then its magnitude is proportional to the next row of the image as it appears on the TV screen from left to right; etc. This analog signal is converted to a sequence of digital pixels by a sample-and-hold circuit 91, and the resulting pixels are sequentially sent to a shifter circuit 92.

Circuit 92 contains four serial-parallel shift registers 92a, 92b, 92c, and 92d. Register 92a has a serial input on its right which receives pixels from the sample-and-hold circuit 91. Those pixels are serially shifted to the left; and when register 92a holds a complete row of pixels, that row is transferred in parallel to register 92b. At the same time, the contents of register 92b are transferred in parallel to register 92c, and the contents of register 92c are transferred in parallel to register 92d.

Registers 92a-92d also shift serially from right to left in synchronization with register 92a. Further, registers 92b and 92c shift in a circular fashion such that the pixels in their leftmost stage are returned to the rightmost stage with each shift. As a result, the nine pixels of each pixel group $G_{rc}$ in the image 10 are sequentially transferred to the three leftmost stages of registers 92b, 92c, and 92d. From those stages, the pixel groups $G_{rc}$ are sequentially sent to the quantization-encoder 20 via a set of conductors 92e. Output signals $I_1$, $I_2$, etc. from the quantization-encoder 20 are then used to address the memory 30 as previously described.

Figure 8:
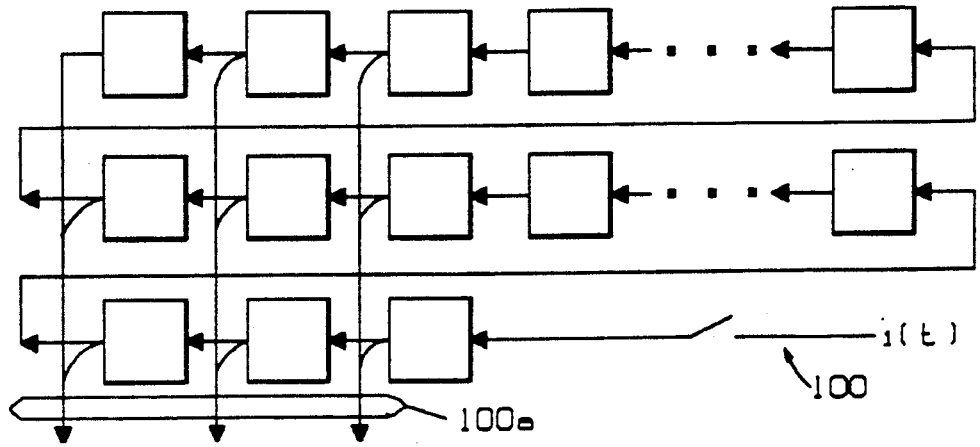
FIG. 8 illustrates another circuit which sequentially forms the groups of pixels that are operated on in the FIG. 1 process.

Another alternative embodiment to the shifter circuit 92, which uses less hardware, is shown in FIG. 8. This embodiment consists of just a single serial shift register 100 which has only (N/2+3) stage, where N is the number of stages in shift register 92. Also, each stage of register 100 is simpler than a stage of register 100 since register 100 only shifts in a serial fashion. Output lines 100a from register 100 come from its first three stages, its last three stages, and its middle three stages. By so arranging the output lines, all of the pixels of the pixel groups $G_{rc}$ sequentially appear on them, just as the pixel groups did in the FIG. 7 embodiment.

Several preferred image filtering processes, as well as circuitry for carrying out those processes, have now been described in detail. In addition, however, many changes and modifications can be made to these details without departing from the nature and spirit of the invention.

For example, the size of the pixel groups $G_{rc}$ can be changed. And, in general, the fidelity of the FIG. 1 filtering will increase as the size of the pixel groups increases. Preferably, each of the pixel groups $G_{rc}$ is an mxn matrix where m and n are respective integers between two and twenty. Also, as the size of the pixel groups $G_{rc}$ is changed, the other matrices H and G of FIGS. 4, 5, and 6 must change in the same fashion.

As another modification, the FIG. 1 process can be used to filter arrays of data other than pixels. For example, each square in the array of FIG. 1 from which the groups $G_{rc}$ are formed can be a data point which gives a seismic echo at that location; or it can be a data point which gives an X-ray transmission at that location. In such a case, all of the steps of FIG. 1 and FIGS. 4-6 remain the same.

As still another modification, the FIG. 1 process can be employed on arrays of data which are other than two-dimensional. For example, a third dimension can be added to the array of FIG. 1 from which the groups $G_{rc}$ are formed, with the third dimension being the color of each pixel. Alternatively, the array of FIG. 1 from which the groups $G_{rc}$ are formed can have just one dimension. This would occur, for example, if the data points in the array were periodic samples of a single time varying voltage signal, such as a radio signal or a speech signal.

As still a further modification, the FIG. 1 process can be carried out with many previously disclosed physical implementations of the individual components which that process uses. For example, one suitable implementation of the quantization-encoder 20 is disclosed in U.S. Pat. No. 4,727,354 which is assigned to the present assignee. Similarly, the memory 30 can be any conventional read-write semiconductor memory.

Accordingly, it is to be understood that the invention is not limited to the above detailed examples but is defined by the appended claims.

What is claimed is:

1. A method of filtering an array of data samples, including the steps of:
   selecting several standard data sample groups;
   transforming each standard data sample group into a respective single data sample, and storing each transformed data sample in a memory;
   reading a respective input group of data samples from said array for each individual sample in the array; each input group of samples being a subset of all of the samples in said array, being contiguous with the individual sample, and overlapping other input groups of samples;
   generating an identifier for each input data sample group that identifies which one of said standard data sample groups most closely matches the input data sample group;
   retrieving from said memory, for each generated identifier, the single data sample which is stored as the transformation of the standard data input group that is identified by the identifier; and,
   concatenating the retrieved data samples to form the filtered array.

2. A method according to claim 1 wherein said array and said standard data sample groups on which said transforming step is performed are two-dimensional.

3. A method according to claim 2 wherein said data samples are image pixels.

4. A method according to claim 3 wherein said transforming step is performed with a transformation of the form $$X = k_1 \sum_{i=0}^{n-1} h_i p_i, \quad Y = k_2 \sum_{i=0}^{n-1} g_i p_i$$

where $p_i$ is a pixel in a standard group of n pixels, and $k_1$, $K_2$, $h_i$, and $g_i$ are constants.

5. A method according to claim 3 wherein said transforming step is performed with a transformation of the form $$Z = k \sum_{i=0}^{n-1} h_i p_i$$

where $p_i$ is a pixel in a standard group of n pixels and k and $h_i$ are constants.

6. A method according to claim 3 wherein said transforming step is performed with a transformation of the form $$Z = f_4(W), \quad W = f_3(X, Y),$$

$$X = k_1 \sum_{i=0}^{n-1} h_i f_1(p_i), \quad Y = k_2 \sum_{i=0}^{n-1} g_i f_2(p_i)$$

where $p_i$ is a pixel in a standard group of n pixels, and $k_1$, $k_2$, $h_i$, and $g_i$ are constants.

7. A method according to claim 1 wherein said array and said standard data sample groups on which said transforming step is performed are three-dimensional.

8. A method according to claim 7 wherein said data samples are image pixels with color.

9. A method according to claim 1 wherein said array and said standard data sample groups on which said transforming step is performed are one-dimensional.

10. A method according to claim 9 wherein said transforming step is performed with a transformation of the form $$Z = k \sum_{i=0}^{n-1} h_i d_i$$

where $d_i$ is a data sample in a standard group of n samples, and k and $h_i$ are constants.

* * * * *